United States Patent [19]

McMurtrey

[11] Patent Number: 4,537,525

[45] Date of Patent: Aug. 27, 1985

[54] BICYCLE HANDLEBAR STEM

[76] Inventor: David K. McMurtrey, 540 S. Algonquin Dr., Mayville, Ky. 41056

[21] Appl. No.: 640,638

[22] Filed: Jun. 4, 1984

Related U.S. Application Data

[63] Continuation of Ser. No. 492,807, May 9, 1983.

[51] Int. Cl.$^3$ .............................................. F16B 7/08
[52] U.S. Cl. ................................... 403/191; 403/233; 403/271; 403/374; 228/173.6; 74/551.1
[58] Field of Search .............. 403/209, 191, 234, 233, 403/271, 272, 374; 74/551.1, 551.6, 551.3; 228/173 C; 72/379

[56] References Cited

U.S. PATENT DOCUMENTS

| | | | |
|---|---|---|---|
| 2,487,661 | 11/1949 | McCauley, Jr. | 74/551.6 |
| 2,505,648 | 4/1950 | Pawsat | 403/209 X |
| 3,385,615 | 5/1968 | Hussey | 74/551.6 X |
| 3,605,248 | 9/1971 | Yoshikawa | 228/173 |
| 4,363,436 | 12/1982 | Evans et al. | 228/173 C |

FOREIGN PATENT DOCUMENTS 520556  4/1940  United Kingdom ................ 403/272

Primary Examiner—Andrew V. Kundrat
Attorney, Agent, or Firm—Wood, Herron & Evans

[57] ABSTRACT

A bicycle handlebar drop stem is disclosed wherein the step is manufactured from a single piece sheet metal blank. The blank is configured by a series of dies such that it is formed into a cylindrical post having an integral neck section and handlebar receiving head. The neck and head extend downwardly at an acute angle to the cylindrical post. To accommodate this downward angulation of the neck relative to the post, the blank is notched at the interface of the neck and cylindrical post sections of the blank and depending flanges of the configured stem are welded to the cylindrical post.

10 Claims, 5 Drawing Figures

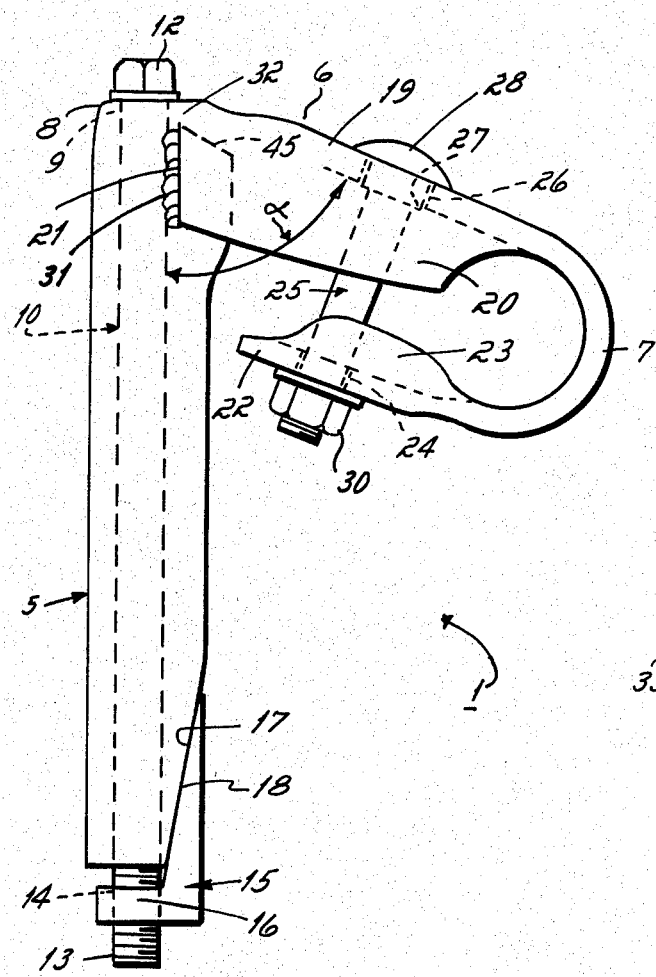
FIGURE 1
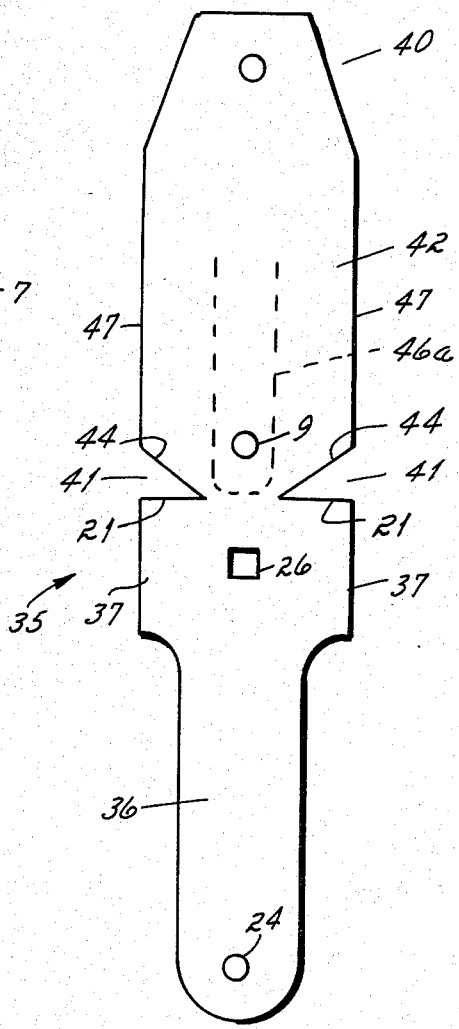
FIGURE 2
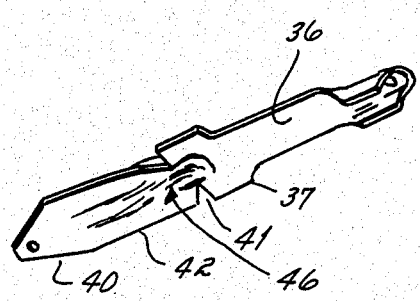
FIGURE 3
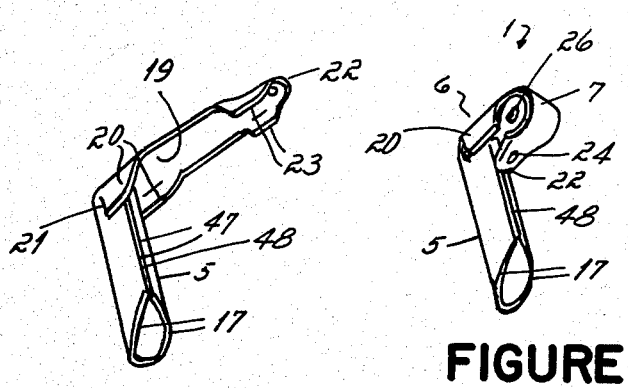
FIGURE 4
FIGURE 5

BICYCLE HANDLEBAR STEM

This is a continuation, of application Ser. No. 492,807, filed May 9, 1983.

The present invention relates to an improved bicycle handlebar support stem and a novel method of manufacturing the stem.

It is now well known to the prior art to manufacture a bicycle handlebar stem from a single piece of sheet metal formed by a series of progressive die operations in presses. Such a bicycle handlebar stem and method of manufacturing the same is disclosed in E. F. Pawsat U.S. Pat. No. 2,505,648.

The stem and the method by which it is manufactured disclosed in the patent lends itself to the manufacture of handlebar stems which have the strength of a cast or forged stem but which may be manufactured less expensively on a press utilizing a series of progressive dies. To date though, this technique has been limited to certain styles of handlebar stems because the process as disclosed in this patent and as practiced commercially does not lend itself to the manufacture of other styles. Specifically, the process disclosed in this patent of utilizing a series of progressive dies to form a stem from a sheet metal blank lends itself to the manufacture of a stem in which the neck and head of the stem extend upwardly relative to the vertical post as illustrated in U.S. Pat. No. 2,505,648. But this method does not lend itself to the manufacture of handlebar stems wherein the neck and head of the stem extend downwardly relative to the vertical post. Such stems are referred to as drop stems and are popular for certain styles of bicycles.

There have been prior attempts to utilize progressive die-forming techniques to form drop stems from sheet metal but those attempts have heretofore been commercial failures. One such attempt involved simply notching the neck flange of the stem at the point at which it tends to double over upon itself and crack when bent at more than a 90° angle relative to the vertical post. When so notched, though, the neck was weak at the apex of the notch so that it still tended to crack or fail at that point.

Another attempt which was made to form a drop handlebar stem from a die formed sheet metal stem involved heating the neck of the stem at the point at which it was bent relative to the vertical post. Utilizing this technique, it was found that when the neck was bent after having been heated, it still tended to crack at the apex of the angle between the vertical post and the neck.

It has, therefore, been one objective of this invention to provide a bicycle handlebar drop stem having the neck and head of the stem extending downwardly relative to the post which may be formed by progressive dies from a single piece of sheet metal.

The invention of this application accomplishes this objective by forming the sheet metal blank from which the drop stem is formed with notches in opposite sides of the blank at the location of the intersection between the neck and the post and then welding the neck flanges to the post after the blank is completely formed by the progressive forming dies. These notches enable the neck section to be bent more than 90° relative to the vertical post and the welding of the vertical sides of the neck section formed by the notches to the vertical post imparts the necessary strength to resist failure or cracking of the stem at the intersection of the neck and the post.

The advantage of this drop stem wherein the flange or vertical sections of the neck of the stem are welded to opposite sides of the vertical post is that it enables a drop stem to be formed by a series of progressive dies from a single piece of sheet metal. Thereby, an acceptable drop stem is formed from a sheet metal blank.

Still another advantage of this stem is that it enables a drop stem to be formed from a single sheet metal blank upon progressive tooling which presently exists and is currently being used to form bicycle handlebar stems in which the neck and head of the stem extend upwardly relative to the vertical post of the stem. With very little modification, this tooling may be used to form the drop stem of this invention.

These and other objects and advantages of this invention will be more readily apparent from the following description of the drawings in which:

FIG. 1 is a side elevational view of a bicycle handlebar support stem incorporating the invention of this application.

FIG. 2 is a plan view of a sheet metal blank from which the stem of FIG. 1 is manufactured.

FIGS. 3, 4 and 5 are sequential perspective views of the stem manufactured from the blank of FIG. 2 illustrating the forming process utilized to shape the stem of FIG. 1.

Referring first to FIG. 1, it will be seen that the bicycle handlebar stem 1 of this invention comprises a straight, cylindrical, vertical post 5, an integral neck 6 extending at an acute angle to the post 5 and a substantially cylindrical head 7. The head 7 is adapted to receive and clamp a handlebar of a bicycle. At the junction of the neck 6 and the post 5 there is formed a boss 8 provided with a perforation 9 to receive a stem bolt 10 which extends axially downwardly through the straight cylindrical portion 5 of the post. At its upper end the stem bolt carries a head 12 adapted to receive a tool whereby the bolt may be rotated. At the opposite end, the bolt is furnished with threads 13 which engage complimentary threads within the longitudinal bore 14 of a wedge piece 15. This wedge piece functions to impart an expanding action to the stem within the hollow cylindrical portion of a bicycle front wheel fork, so that when expanded, the opposite sides of a wedge piece and the post grip the inner wall of the hollow cylindrical portion of the bicycle front wheel fork to preclude relative movement of the post and the fork. The wedge piece includes an internally threaded boss 16. The post is provided with an obliquely exposed seat or taper 17, the angularity of which is complimentary to the angle of the oblique surface 18 of the wedge piece. As will be readily understood, rotation of screw 10 in one direction serves to elevate the wedge piece 15 and cause it to gradually progress laterally as it slides upon the tapered portion 17 of the post. In this way, the aforesaid clamping action is effected within the hollow stem of the steering fork.

The neck 6 of the steering post extends obliquely outwardly and downwardly from the axis of the post so that an acute angle α if defined therebetween. A stem having the neck so angled relative to the post is referred to as a "drop" stem as opposed to a stem having an upwardly angled neck as illustrated in the above identified U.S. Pat. No. 2,505,648.

The neck 6 is formed with a top portion 19 and a pair of downwardly extending flanges 20, located on opposite sides of the top portion. At its outer end the neck terminates in the head 7 which is generally circular in configuration. The free end 22 of the head 7 is formed with upwardly extending edges or flanges 23. The free end 22 is perforated as indicated at 24 to receive a head clamp bolt 25. The same bolt passes through a perforation 26 of the top portion 19, this latter perforation being preferably square in shape to receive the squared portion 27 of the bolt head 28.

The flanges 20 on opposite sides of the top 19 of the neck extend downwardly from the top portion 19 of the neck and have lower edges located in a position to provide a stop against which the upstanding flanges 23 at the free end of the head 7 may abut when the head is fully contracted about a handlebar by tightening the clamping nut 30.

In order to rigidify the stem, the vertical edges 21 of the flanges 20 are welded to the periphery of the post 5 as indicated at 31. Absent these welds, the stem would be very weak at the point indicated by the numeral 32 where the inside edge of the post 5 joins the neck portion 6 of the stem 1. This relatively weak point is the apex of the angle α between the post and the neck. In the absence of this weld the stem would be subject to failure and cracking of the stem at this point 32.

The entire bicycle stem exclusive of the clamping nut 30, the bolt 25, the stem bolt 10, and the wedge piece 15 is formed in one piece from the sheet metal blank 35 illustrated in FIG. 2. This blank has at one end a tongue 36 of limited width to be curved to establish the clamping head 7 of the stem. The extreme end of the tongue is formed by progressive dies to develop it into the flanged end 22 of the head, which end is adapted to overlie the flanges 20 of the neck portion 6 as previously explained. The neck flanges 20 are formed from a pair of shoulders 37 of the blank. The opposite side edges of the shoulders form the lower edges of the flanges.

The opposite end of the blank from the tongue 36 is tapered as indicated at 40 to form the tapered end 17 on the post 5. The portion of the blank between the tapered end 36 and a pair of notches 41 is generally rectangular. This rectangular section 42 when formed into a cylindrical configuration forms the cylindrical post 5 of the stem.

The notches 41 between the post forming section 42 and the neck forming section 36 are generally V-shaped. The edges 21 of these notches on the shoulder side of the blank form the vertical welded edges 21 of the stem while the notch edges 44 on the post forming sides of the notches 41, form the top 45 of the cylindrical post.

The integral stem illustrated in FIG. 5 is formed from the sheet metal blank illustrated in FIG. 2 by passing the blank through a series of dies in presses. There are usually as many as six or seven different die forming steps involved between the stamping of the blank illustrated in FIG. 2 and the complete forming of the stem as illustrated in FIG. 5. Only two of these intermediate steps are illustrated in FIGS. 3 and 4 since these die forming steps per se form no part of the invention of this application and are well known to persons skilled in this art.

The first step in the forming of the stem of FIG. 5 is to emboss the blank along the broken line 46a to form a deep recess resulting in a depression 46. Thereafter, the embossed blank is subjected to a forming operation which bends it longitudinally as illustrated in FIG. 3 to establish the U-shaped form of the blank. In subsequent operations, the post portion of the blank is bent to form the cylindrical post section 5 with its edges 47, 47 meeting along the seam 48 and the tongue portion 36 is given its curvature to provide the handlebar clamping head 7. The necessary apertures 9, 24, 26 for receiving the bolts 10 and 25 may be punched, drilled, or otherwise formed in the material at any stage of the process.

After the blank has been formed, the edges 21 of the flanges 20 are welded to the periphery of the post 5 as indicated at 31. This welding is an essential step to obtain the necessary strength and rigidity of the stem so as to enable it to be utilized to attach the handlebar to the front wheel fork of a bicycle. After this welded seam 31 has been completed, it is generally ground so as to render it smooth and unobstrusive preparatory to the stem being subsequently painted or plated. The stem is then completed by the addition of the stem bolt 10, wedge piece 15 and the handlebar clamping bolt 25 with nut 30.

The primary advantage of this invention is that it enables a manufacturing process which has heretofore been limited to bicycle handlebar stems which extend upwardly and outwardly at an obtuse angle to the post to be utilized in the manufacture of a handlebar stem wherein the neck and head extend downwardly at an acute angle to the post so as to form a so-called "drop stem." Prior to this invention it had not been possible to form a drop stem from a single sheet of metal utilizing a series of progressive dies.

Having described my invention, I claim:

1. A one-piece, sheet metal bicycle handlebar mounting stem comprising,
    a hollow cylindrical post section adapted to be mounted within the stem of a fork of a bicycle,
    a neck section integral with and extending from the top of said post section, said neck section having a top portion and a pair of side flanges, said top portion defining an acute angle with said post section, one edge of each of said pair of said flanges extending generally parallel to the axis of said cylindrical post section, said one edge of each said pair of side flanges being welded to the periphery of said post section, and
    a handlebar receiving head section of substantially cylindrical shape formed integral with said neck section.

2. The handlebar mounting stem of claim 1 wherein said head section has a free end, said free end having flanges on the sides thereof to impart strength and resistance to deformation of said free end, said free end of said clamping head being located on the underside of said side flanges of said neck section.

3. The handlebar mounting stem of claim 1 wherein the axis of said cylindrical clamping head is substantially perpendicular to a plane containing the axis of said post section.

4. The handlebar mounting stem of claim 1 wherein said free end of said clamping head is provided with a first bore and said neck section is provided with a second aligned bore, said aligned bores being adapted to receive a bolt disposed in said bores, which bolt is adapted to force said free end of said clamping head toward the underside of said side flanges of said neck section.

5. The handlebar clamping stem of claim 1 wherein said hollow post section has a perforation at the top thereof, said perforation being adapted to receive a bolt extending vertically through said hollow post, the lower end of said bolt being adapted to be threaded into a generally wedge-shaped nut engageable with a bottom surface of said post, said bottom surface of said post extending at an oblique angle to the axis of said hollow cylindrical post so that axial movement of said nut over said oblique bottom surface results in lateral movement as well as axial movement of said nut.

6. The method of manufacturing a one-piece sheet metal bicycle handlebar mounting stem which comprises, stamping a sheet metal blank, said blank having an integrally connected post forming section, a neck forming section, and a head forming section, forming said post forming section of said blank into a generally hollow cylindrical post, forming said neck forming section of said blank into a top portion and a pair of side flanges extending from said top portion, bending said blank so that said neck portion of said blank extends at an included acute angle to said post section and edges of said flanges are located in juxtaposition to said hollow cylindrical post, forming said head section into a generally cylindrical handlebar clamping head, and welding said side flanges of said neck portion to said hollow cylindrical post.

7. A one-piece, sheet metal bicycle handlebar mounting stem comprising, a hollow cylindrical post section adapted to be mounted within the stem of a fork of a bicycle, a neck section integral with and extending from the top of said post section, said neck section having a top portion and a pair of side flanges, said top portion defining an acute angle with said post section, each of said pair of flanges having one edge located in juxtaposition to said cylindrical post section, said one edge of each of said pair of side flanges being welded to the said cylindrical post section, and a handlebar receiving head section of substantially cylindrical shape formed integral with said neck section.

8. A one-piece, sheet metal bicycle handlebar mounting stem comprising, a hollow cylindrical post section adapted to be mounted within the stem of a fork of a bicycle, a neck section integral with and extending from the top of said post section, said neck section having a top portion and a pair of side flanges, said top portion defining an angle with said post section, one edge of each of said pair of said flanges extending generally parallel to the axis of said cylindrical post section, said one edge of each of said pair of side flanges being welded to the periphery of said post section, and a handlebar receiving head section of substantially cylindrical shape formed integral with said neck section.

9. The method of manufacturing a one-piece sheet metal bicycle handlebar mounting stem which comprises, stamping a sheet metal blank, said blank having an integrally connected post forming section, a neck forming section, and a head forming section, forming said post forming section of said blank into a generally hollow cylindrical post, forming said neck forming section of said blank into a top portion and a pair of side flanges extending from said top portion, bending said blank so that said neck portion of said blank extends at an angle to said post section and edges of said flanges are located in juxtaposition to said hollow cylindrical post, forming said head section into a generally cylindrical handlebar clamping head, and welding said side flanges of said neck portion to said hollow cylindrical post.

10. A one-piece, sheet metal bicycle handlebar mounting stem comprising, a hollow cylindrical post section adapted to be mounted within the stem of a fork of a bicycle, a neck section integral with and extending from the top of said post section, said neck section having a top portion and a pair of side flanges, said top portion defining an angle with said post section, each of said pair of flanges having one edge located in juxtaposition to said cylindrical post section, said one edge of each of said pair of side flanges being welded to the said cylindrical post section, and a handlebar receiving head section of substantially cylindrical shape formed integral with said neck section.

* * * * *